United States Patent
Pang et al.

(10) Patent No.: US 10,909,299 B1
(45) Date of Patent: Feb. 2, 2021

(54) METHOD FOR STABILIZING BANDGAP VOLTAGE

(71) Applicant: UNITED MICROELECTRONICS CORP., Hsin-Chu (TW)

(72) Inventors: Wei Pang, Singapore (SG); Jing Feng, Singapore (SG); Xiaohong Jiang, Singapore (SG); Ching Hwa Tey, Singapore (SG)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 0 days.

(21) Appl. No.: 16/881,020

(22) Filed: May 22, 2020

(30) Foreign Application Priority Data

Apr. 27, 2020 (CN) .......................... 2020 1 0343523

(51) Int. Cl.
| | |
|---|---|
| *G06F 17/50* | (2006.01) |
| *G03F 1/36* | (2012.01) |
| *G06F 30/392* | (2020.01) |
| *G06F 119/06* | (2020.01) |
| *G06F 30/373* | (2020.01) |
| *G06F 30/337* | (2020.01) |
| *G06F 30/347* | (2020.01) |

(52) U.S. Cl.
CPC .............. *G06F 30/392* (2020.01); *G03F 1/36* (2013.01); *G06F 30/337* (2020.01); *G06F 30/347* (2020.01); *G06F 30/373* (2020.01); *G06F 2119/06* (2020.01)

(58) Field of Classification Search
CPC .... G06F 30/392; G06F 30/337; G06F 30/347; G06F 30/373; G06F 2119/06; G03F 1/36

USPC ................ 716/54, 55, 119, 133; 703/15
See application file for complete search history.

(56) References Cited

U.S. PATENT DOCUMENTS

| | | | | |
|---|---|---|---|---|
| 7,349,190 | B1* | 3/2008 | Maheedhar | G06F 1/28 327/77 |
| 9,612,606 | B2 | 4/2017 | Horng et al. | |
| 2001/0007429 | A1* | 7/2001 | Shih | G11C 5/143 327/74 |
| 2007/0152740 | A1* | 7/2007 | Georgescu | G05F 3/30 327/539 |
| 2009/0294874 | A1* | 12/2009 | Lee | H01L 27/10894 257/401 |
| 2014/0192841 | A1* | 7/2014 | Zhan | G06F 11/10 375/130 |

(Continued)

FOREIGN PATENT DOCUMENTS

JP     2004318604 A  * 11/2004

OTHER PUBLICATIONS

Nam, Korean Patent Document No. KR 547245 B1, published Jan. 31, 2006, abstract and 1 drawing. (Year: 2006).*

(Continued)

*Primary Examiner* — Phallaka Kik
(74) *Attorney, Agent, or Firm* — Winston Hsu

(57) ABSTRACT

A method for stabilizing bandgap voltage includes the steps of: providing a first layout pattern designated with a first voltage; reducing a critical dimension of the first layout pattern for generating a second layout pattern corresponding to a second voltage; matching the second voltage with a target voltage; and then outputting the second layout pattern to a mask. Preferably, the first layout pattern and the second layout pattern include polysilicon resistor patterns.

10 Claims, 2 Drawing Sheets

(56) References Cited

U.S. PATENT DOCUMENTS

2014/0287483 A1* 9/2014 Berger ................. B82B 3/0057
435/252.1
2014/0312876 A1* 10/2014 Hanson .................... G05F 3/08
323/314

OTHER PUBLICATIONS

Fang J et al., Chinese Patent Document No. CN 205721472 U, published Nov. 23, 2016, abstract and 1 drawing. (Year: 2016).*

* cited by examiner

METHOD FOR STABILIZING BANDGAP VOLTAGE

BACKGROUND OF THE INVENTION

1. Field of the Invention

The invention relates to a method for stabilizing voltage of a bandgap circuit.

2. Description of the Prior Art

In current circuit design, bandgap reference circuit has been a common circuit for providing predetermined voltage, which typically has the advantages of low power consumption and stable output voltage. Through adjusting voltage division of internal transistor interfaces and electrical current division of internal resistances, reference voltages provided by bandgap reference circuits are not easily affected by outside temperature. Hence bandgap reference circuits could be serving as a reliable voltage source for stabilizing voltages.

Typically, technical parameter analysis for current bandgap reference circuits could be achieved by three means of verification including resistor matching, I/O device matching, and bipolar junction transistor (BJT) matching. However it has been observed that the voltage of bandgap reference circuits under product verification could only reach 1.11 V, approximately 90 mV less than the 1.2 V of a model target. Despite the bandgap reference circuit provided by the client employed a new design, the new design still followed the 40 nm low-power fabrication standard and passed the aforementioned three means of verification. Hence how to provide a new solution for the voltage of bandgap reference circuit to reach model target in addition to the above three means of verification has become an important task in this field.

SUMMARY OF THE INVENTION

According to an embodiment of the present invention, a method for stabilizing bandgap voltage includes the steps of: providing a first layout pattern designated with a first voltage; reducing a critical dimension of the first layout pattern for generating a second layout pattern corresponding to a second voltage; matching the second voltage with a target voltage; and outputting the second layout pattern to a mask.

According to an embodiment of the present invention, the first layout pattern and the second layout pattern include polysilicon resistor patterns.

According to an embodiment of the present invention, further comprising reducing a width of the first layout pattern for generating the second layout pattern.

According to an embodiment of the present invention, further comprising reducing the width of the first layout pattern for generating the second layout pattern and a third layout pattern.

According to an embodiment of the present invention, further comprising reducing the width of the first layout pattern between 2% to 4% for generating the second layout pattern.

According to an embodiment of the present invention, further comprising reducing the width of the first layout pattern between 4% to 6% for generating the third layout pattern.

According to an embodiment of the present invention, the second layout pattern corresponds to the second voltage and the third layout pattern corresponds to a third voltage.

According to an embodiment of the present invention, further comprising matching the third voltage with the target voltage.

According to an embodiment of the present invention, further comprising reducing the width of the first layout pattern for generating the second layout pattern, the third layout pattern, and a fourth layout pattern.

According to an embodiment of the present invention, further comprising reducing the width of the first layout pattern between 6% to 8% for generating the fourth layout pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
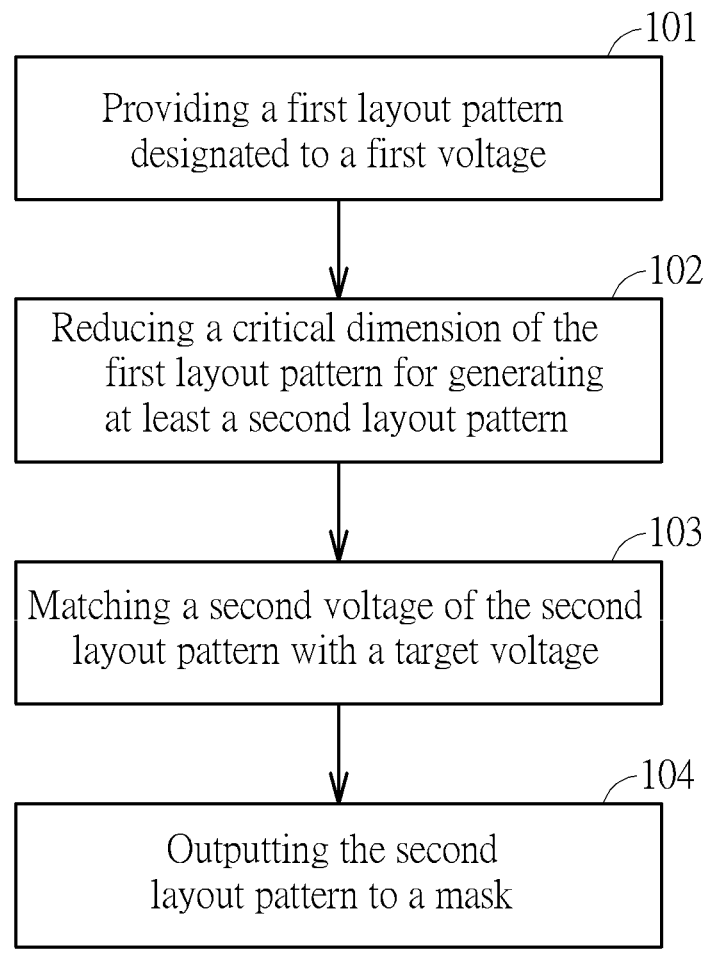
FIG. 1 illustrates a flow chart for stabilizing bandgap voltage according to an embodiment of the present invention.
Figure 2:
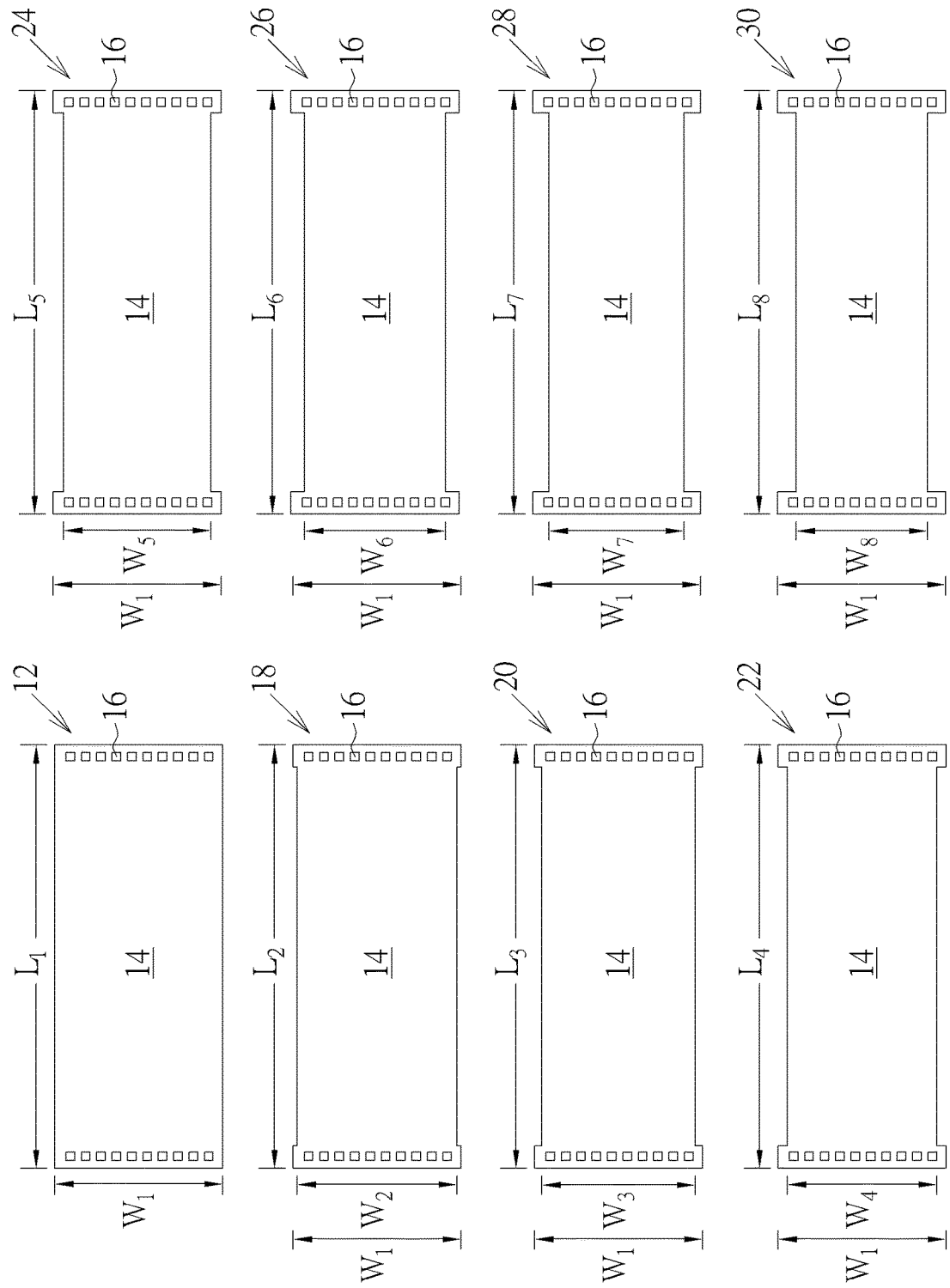
FIG. 2 illustrates a method of using sizing approach to adjust layout patterns for stabilizing bandgap voltage.

Referring to FIGS. 1-2, FIG. 1 illustrates a flow chart for stabilizing bandgap voltage according to an embodiment of the present invention and FIG. 2 illustrates a method of using sizing approach to adjust layout patterns for stabilizing bandgap voltage. As shown in FIGS. 1-2, step 101 is first conducted by providing a mask design data or a first layout pattern 12 as shown in FIG. 2 according to an integrated circuit such as a bandgap reference circuit, in which the mask design data has various forms including but not limited to Organization for the Advancement of Structured Information Standards (OASIS), Graphic Data System (GDS), and 2nd Graphic Data System (GDSII). Furthermore, the mask design data also can have various formats including but again not limited to text files (Microsoft Word or plain-text), Microsoft Excel, portable document format (Adobe PDF), electronic mail (email), facsimile (fax), and even a plurality of photo or image formats. The formats mentioned above are only for illustrative purposes and does not intend to be taken as limitations of the present invention.

In this embodiment, the first layout pattern 12 is preferably a predetermined layout pattern provided by the client which preferably includes the aforementioned GDS files corresponding to a polysilicon resistor pattern for follow-up semiconductor process. Specifically, the first layout pattern 12 include a polysilicon resistor pattern 14 and contact pads 16 adjacent to two sides of the polysilicon resistor pattern 14, in which the first layout pattern 12 or polysilicon resistor pattern 14 includes a first width $W_1$ and a first length $L_1$ and the first layout pattern 12 is designated to a first voltage after measurement.

Next, step 102 is conducted to reduce the critical dimension of first layout pattern 12 for generating at least another layout pattern such as a second layout pattern 18, a third layout pattern 20, a fourth layout pattern 22, a fifth layout pattern 24, a sixth layout pattern 26, a seventh layout pattern 28, and an eighth layout pattern 30. Overall, a sizing down step is conducted on the first layout pattern 12 provided by the client at this stage to reduce the predetermined first width $W_1$ of the first layout pattern 12 for generating one or more than one layout patterns such as the second layout pattern 18, the third layout pattern 20, the fourth layout pattern 22, the fifth layout pattern 24, the sixth layout pattern 26, the seventh layout pattern 28, and the eighth layout pattern 30, in which each of the layout patterns generated includes a polysilicon resistor pattern 14 and contact pads 16 adjacent to two sides of the polysilicon resistor pattern 14 and the range or amount of reduction from the second layout pattern 18 to the eighth layout pattern 20 preferably decreases gradually depending on the demand of the product.

For instance, the second layout pattern 18 includes the aforementioned first width $W_1$, a sized down second width $W_2$, and a second length $L_2$, in which the method for generating the second layout pattern 18 or more specifically the second width $W_2$ of the second layout pattern 18 could be accomplished by reducing the first width $W_1$ of the first layout pattern 12 between 2% to 4% so that the polysilicon resistor pattern 14 outside the contact pads 16 of the second layout pattern 18 is shrunk from the first width $W_1$ to the second width $W_2$. In this embodiment, the amount of shrinkage from the first width $W_1$ on one side or a single side of the second layout pattern 18 is preferably between 20 nm to 30 nm or most preferably at 25 nm or from an overall perspective, the total shrinkage for obtaining the second width $W_2$ on two sides of the second layout pattern 18 from the first width $W_1$ of the first layout pattern 12 is approximately 50 nm. It should be noted since the overall width of the second layout pattern 18 is reduced, the corresponding resistance and voltage of the second layout pattern 18 are increased accordingly as the sized down second layout pattern 18 includes a second voltage after measurement.

Similar to the second layout pattern 18, the third layout pattern 20 includes the aforementioned first width $W_1$, a sized down third width $W_3$, and a third length $L_3$, in which the method for generating the third layout pattern 20 or more specifically the third width $W_3$ of the third layout pattern 20 could be accomplished by reducing the first width $W_1$ of the first layout pattern 12 between 4% to 6% so that the polysilicon resistor pattern 14 outside the contact pads 16 of the third layout pattern 20 is shrunk from the first width $W_1$ to the third width $W_3$. In this embodiment, the amount of shrinkage from the first width $W_1$ on one side or a single side of the third layout pattern 20 is preferably between 45 nm to 55 nm or most preferably at 50 nm or from an overall perspective, the total shrinkage for obtaining the third width $W_3$ on two sides of the third layout pattern 20 from the first width $W_1$ of the first layout pattern 12 is approximately 100 nm. Since the overall width of the third layout pattern 20 is reduced, the corresponding resistance and voltage of the third layout pattern 20 are increased accordingly as the sized down third layout pattern 20 includes a third voltage after measurement.

Similar to the third layout pattern 20, the fourth layout pattern 22 includes the aforementioned first width $W_1$, a sized down fourth width $W_4$, and a fourth length $L_4$, in which the method for generating the fourth width $W_4$ of the fourth layout pattern 22 could be accomplished by reducing the first width $W_1$ of the first layout pattern 12 between 6% to 8% so that the polysilicon resistor pattern 14 outside the contact pads 16 of the fourth layout pattern 22 is shrunk from the first width $W_1$ to the fourth width $W_4$. In this embodiment, the amount of shrinkage from the first width $W_1$ on one side or a single side of the fourth layout pattern 22 is preferably between 70 nm to 80 nm or most preferably at 75 nm or from an overall perspective, the total shrinkage for obtaining the fourth width $W_4$ on two sides of the fourth layout pattern 22 from the first width $W_1$ of the first layout pattern 12 is approximately 150 nm. Since the overall width of the fourth layout pattern 22 is reduced, the corresponding resistance and voltage of the fourth layout pattern 22 are increased accordingly as the sized down fourth layout pattern 22 includes a fourth voltage after measurement.

Similar to the fourth layout pattern 22, the fifth layout pattern 24 includes the aforementioned first width $W_1$, a sized down fifth width $W_5$, and a fifth length $L_5$, in which the method for generating the fifth width $W_5$ of the fifth layout pattern 24 could be accomplished by reducing the first width $W_1$ of the first layout pattern 12 between 8% to 10% so that the polysilicon resistor pattern 14 outside the contact pads 16 of the fifth layout pattern 24 is shrunk from the first width $W_1$ to the fifth width $W_5$. In this embodiment, the amount of shrinkage from the first width $W_1$ on one side or a single side of the fifth layout pattern 24 is preferably between 95 nm to 105 nm or most preferably at 100 nm or from an overall perspective, the total shrinkage for obtaining the fifth width $W_5$ on two sides of the fifth layout pattern 24 from the first width $W_1$ of the first layout pattern 12 is approximately 200 nm. Since the overall width of the fifth layout pattern 24 is reduced, the corresponding resistance and voltage of the fifth layout pattern 24 are increased accordingly as the sized down fifth layout pattern 24 includes a fifth voltage after measurement.

Similar to the fifth layout pattern 24, the sixth layout pattern 26 includes the aforementioned first width $W_1$, a sized down sixth width $W_6$, and a sixth length $L_6$, in which the method for generating the sixth width $W_6$ of the sixth layout pattern 26 could be accomplished by reducing the first width $W_1$ of the first layout pattern 12 between 10% to 12% so that the polysilicon resistor pattern 14 outside the contact pads 16 of the sixth layout pattern 26 is shrunk from the first width $W_1$ to the sixth width $W_6$. In this embodiment, the amount of shrinkage from the first width $W_1$ on one side or a single side of the sixth layout pattern 26 is preferably between 120 nm to 130 nm or most preferably at 125 nm or from an overall perspective, the total shrinkage for obtaining the sixth width $W_6$ on two sides of the sixth layout pattern 26 from the first width $W_1$ of the first layout pattern 12 is approximately 250 nm. Since the overall width of the sixth layout pattern 26 is reduced, the corresponding resistance and voltage of the sixth layout pattern 26 are increased accordingly as the sized down sixth layout pattern 26 includes a sixth voltage after measurement.

Similar to the sixth layout pattern 26, the seventh layout pattern 28 includes the aforementioned first width $W_1$, a sized down seventh width $W_7$, and a seventh length $L_7$, in which the method for generating the seventh width $W_7$ of the seventh layout pattern 28 could be accomplished by reducing the first width $W_1$ of the first layout pattern 12 between 12% to 14% so that the polysilicon resistor pattern 14 outside the contact pads 16 of the seventh layout pattern 28 is shrunk from the first width $W_1$ to the seventh width $W_7$. In this embodiment, the amount of shrinkage from the first width $W_1$ on one side or a single side of the seventh layout pattern 28 is preferably between 145 nm to 155 nm or most preferably at 150 nm or from an overall perspective, the total shrinkage for obtaining the seventh width $W_7$ on two sides of the seventh layout pattern 28 from the first width $W_1$ of the first layout pattern 12 is approximately 300 nm. Since the overall width of the seventh layout pattern 28 is reduced, the corresponding resistance and voltage of the seventh layout pattern 28 are increased accordingly as the sized down seventh layout pattern 28 includes a seventh voltage after measurement.

Similar to the seventh layout pattern 28, the eighth layout pattern 30 includes the aforementioned first width $W_1$, a sized down eighth width $W_8$, and an eighth length $L_8$, in which the method for generating the eighth width $W_8$ of the eighth layout pattern 30 could be accomplished by reducing the first width $W_1$ of the first layout pattern 12 between 14% to 16% so that the polysilicon resistor pattern 14 outside the contact pads 16 of the eighth layout pattern 30 is shrunk from the first width $W_1$ to the eighth width $W_8$. In this embodiment, the amount of shrinkage from the first width $W_1$ on one side or a single side of the eighth layout pattern 30 is preferably between 170 nm to 180 nm or most preferably at 175 nm or from an overall perspective, the total shrinkage for obtaining the eighth width $W_8$ on two sides of the eighth layout pattern 30 from the first width $W_1$ of the first layout pattern 12 is approximately 350 nm. Since the overall width of the eighth layout pattern 30 is reduced, the corresponding resistance and voltage of the eighth layout pattern 30 are increased accordingly as the sized down eighth layout pattern 30 includes an eighth voltage after measurement.

Next, step 103 is conducted to match the voltage measured corresponding to each of the layout patterns 18, 20, 22, 24, 26, 28, 30 generated by reducing the critical dimension of the first layout pattern 12 with a target voltage. For instance, the second voltage of the second layout pattern 18, the third voltage of the third layout pattern 20, the fourth voltage of the fourth layout pattern 22, the fifth voltage of the fifth layout pattern 24, the sixth voltage of the sixth layout pattern 26, the seventh voltage of the seventh layout pattern 28, and the eighth voltage of the eighth layout pattern 30 are compared and matched with a target voltage to determine which of the voltage or voltages generated after the sizing down procedure is closer to the target voltage. In this embodiment, the target voltage is 1.2V of the model target and after the matching step is conducted, voltages of the fifth layout pattern 24 and the sixth layout pattern 26 are determined to be closest to the target voltage hence these two layout patterns 24, 26 will be chosen as target patterns to output the masks.

Next, various correction methods including but not limited to for example optical proximity correction (OPC), process rule check (PRC), and/or lithography rule check (LRC) procedures could be conducted on each of the aforementioned layout patterns, and then step 104 is conducted to output the corrected layout patterns to fabricate masks for producing desirable image patterns on semiconductor wafers.

Viewing from an actual fabrication process perspective, it would be desirable to first input a circuit layout pattern such as the first layout pattern 12 provided by the client into a computer system and then reduce the critical dimension of the first layout pattern 12 for generating a plurality of layout patterns such as the aforementioned second layout pattern 18, the third layout pattern 20, the fourth layout pattern 22, the fifth layout pattern 24, the sixth layout pattern 26, the seventh layout pattern 28, and the eighth layout pattern 20. Next, these eight layout patterns are output to a mask and the mask is used to form eight types of patterns preferably made of polysilicon on a silicon wafer or a semiconductor substrate made of silicon while these first batch of patterns are used as test keys. Next, the eight types of polysilicon patterns formed on the semiconductor substrate according to the eight layout patterns are measured to obtain corresponding resistance and voltage values, the obtained voltages corresponding to each patterns are matched against a target voltage, and then the layout pattern (such as the fifth layout pattern 24 and/or sixth layout pattern 26 from the aforementioned embodiment) having voltage closest to the target voltage is then selected as the target pattern. Next, correction process such as OPC is conducted in the computer system to correct the first layout pattern 12 provided by the client according to the selected target pattern or even replace the first layout pattern 12 with the selected target pattern, and then the corrected layout pattern is output to another mask for fabricating second batch of patterns on the semiconductor substrate. According to other embodiment of the present invention, it would also be desirable to omit the step of forming the layout patterns directly onto a semiconductor substrate by using a simulation approach to match the voltages within a computer system instead, using OPC to correct the layout patterns, and then output the corrected patterns onto a mask for fabricating actual polysilicon patterns onto the semiconductor substrate, which is also within the scope of the present invention.

As stated previously, it has been observed that the voltage of current bandgap reference circuits under product verification could only reach 1.11 V, approximately 90 mV less than the 1.2 V of a model target and since current verifications for bandgap reference circuits including resistor matching, I/O device matching, and bipolar junction transistor (BJT) matching are unable to resolve the issue of insufficient or unstable voltage, the present invention first provides a first layout pattern such as a predetermined layout pattern provided by the client, and then reduces the critical dimension of the first layout pattern to generate multiple layout patterns such as the second layout pattern, the third layout pattern, the fourth layout pattern, the fifth layout pattern, the sixth layout pattern, the seventh layout pattern, and the eighth layout pattern from the aforementioned embodiment, in which each of the layout patterns include a corresponding polysilicon resistor pattern formed during semiconductor process and corresponding voltage after measurement. Since the layout patterns have been undergone different degree of sizing down from the predetermined layout pattern provided by the client, the resistance and voltage of the layout patterns measured afterwards preferably demonstrate different degree of increase after the sizing procedure so that it would be desirable to obtain a layout pattern closer to the model target after the matching process for outputting to a mask and achieving much more stable voltage for the bandgap reference circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for stabilizing bandgap voltage, comprising:
providing a first layout pattern designated with a first voltage;
reducing a critical dimension of the first layout pattern for generating a second layout pattern corresponding to a second voltage;
matching the second voltage with a target voltage; and
outputting the second layout pattern to a mask.

2. The method of claim 1, wherein the first layout pattern and the second layout pattern comprise polysilicon resistor patterns.

3. The method of claim 1, further comprising reducing a width of the first layout pattern for generating the second layout pattern.

4. The method of claim 3, further comprising reducing the width of the first layout pattern for generating the second layout pattern and a third layout pattern.

5. The method of claim 4, further comprising reducing the width of the first layout pattern between 2% to 4% for generating the second layout pattern.

6. The method of claim 4, further comprising reducing the width of the first layout pattern between 4% to 6% for generating the third layout pattern.

7. The method of claim 4, wherein the second layout pattern corresponds to the second voltage and the third layout pattern corresponds to a third voltage.

8. The method of claim 7, further comprising matching the third voltage with the target voltage.

9. The method of claim 4, further comprising reducing the width of the first layout pattern for generating the second layout pattern, the third layout pattern, and a fourth layout pattern.

10. The method of claim 9, further comprising reducing the width of the first layout pattern between 6% to 8% for generating the fourth layout pattern.

\* \* \* \* \*